United States Patent
Ono

(10) Patent No.: US 10,479,424 B2
(45) Date of Patent: Nov. 19, 2019

(54) TOOL STORAGE DEVICE USED IN A VEHICLE

(71) Applicant: TOYOTA BOSHOKU KABUSHIKI KAISHA, Aichi-ken (JP)

(72) Inventor: Teruki Ono, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 36 days.

(21) Appl. No.: 15/683,843

(22) Filed: Aug. 23, 2017

(65) Prior Publication Data
US 2018/0057079 A1    Mar. 1, 2018

(30) Foreign Application Priority Data
Aug. 29, 2016   (JP) .................................. 2016-166618

(51) Int. Cl.
*B62D 43/10* (2006.01)
*B60R 11/06* (2006.01)
*B60R 11/00* (2006.01)

(52) U.S. Cl.
CPC .............. *B62D 43/10* (2013.01); *B60R 11/06* (2013.01); *B60R 2011/0036* (2013.01)

(58) Field of Classification Search
CPC .. B62D 43/10; B60R 11/06; B60R 2011/0036
USPC ........................................................ 296/37.14
See application file for complete search history.

(56) References Cited

U.S. PATENT DOCUMENTS

| | | | | |
|---|---|---|---|---|
| 7,036,697 B2 * | 5/2006 | Hwang | .................... | B60R 11/06 206/373 |
| 7,708,175 B2 * | 5/2010 | Edwards | ................. | B60R 11/06 224/42.14 |
| 9,573,534 B2 | 2/2017 | Hibino et al. | | |
| 2015/0336516 A1 * | 11/2015 | Hibino | .................... | B60R 11/06 296/37.2 |

FOREIGN PATENT DOCUMENTS

JP     2015-223867     12/2015

* cited by examiner

*Primary Examiner* — Joseph D. Pape
*Assistant Examiner* — Dana D Ivey
(74) *Attorney, Agent, or Firm* — Greenblum & Bernstein, P.L.C.

(57) ABSTRACT

A tool storage device used in a vehicle includes a first member storing tools and made of a first material, and a second member receiving the first member to be arranged below a vehicle floor and having a plate shape extending along a floor surface of the vehicle floor, the second member made of a second material different from the first material.

12 Claims, 7 Drawing Sheets

TOOL STORAGE DEVICE USED IN A VEHICLE

CROSS REFERENCE TO RELATED APPLICATION

This application claims priority from Japanese Patent Application No. 2016-166618 filed Aug. 29, 2016. The entire contents of the priority application are incorporated herein by reference.

FIELD OF THE INVENTION

The present disclosure relates to a tool storage device used in a vehicle.

BACKGROUND OF THE INVENTION

A luggage compartment tool storage device where tools are stored is arranged in a space below a vehicle floor. Specifically, such a tool storage device includes a tool storage portion for storing tools and a box peripheral portion that extends from an upper edge of the tool storage portion outward horizontally along an entire periphery of the tool storage portion. The tool storage device is formed of one component and the tool storage portion and the box peripheral portion are made of same material.

SUMMARY OF THE INVENTION

For example, a foaming agent is used as the material for the tool storage device in terms of a cost, and the tool storage portion and the box peripheral portion are reduced in weight and also required to have certain thickness to provide rigidity. However, if the box peripheral portion extending horizontally from the upper edge of the tool storage portion has the thickness that achieves the rigidity, a floor surface of a luggage compartment will be raised by the thickness and a space or a capacity within the luggage compartment is reduced. If synthetic resin having rigidity is used as the material, the component may be thinner, however, the weight of the entire tool storage device is increased.

An objective of the present technology is to provide a tool storage device that reduces weight thereof and provides a larger space above a vehicle floor.

To solve the above problems, a tool storage device used in a vehicle includes a first member storing tools and made of a first material, and a second member receiving the first member to be arranged below a vehicle floor and having a plate shape extending along a floor surface of the vehicle floor, the second member made of a second material different from the first material.

DETAILED DESCRIPTION OF EMBODIMENTS

Figure 1:
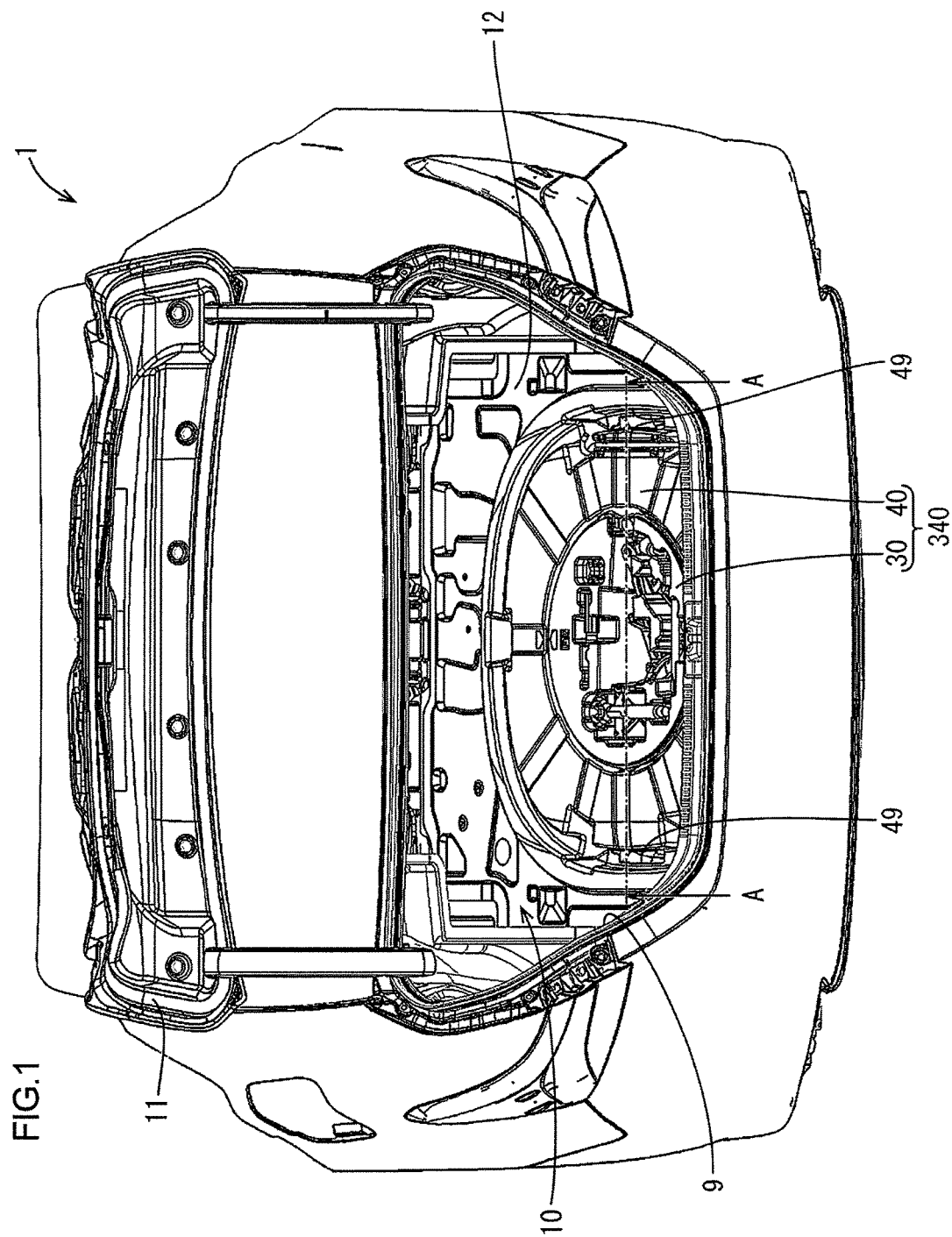
FIG. 1 is a rear view illustrating a vehicle including a tool storage device according to one embodiment arranged below a floor.

One embodiment of the present technology will be described with reference to FIGS. 1 to 7. FIG. 1 illustrates a vehicle 1 seen from a vehicular rear side. In FIG. 1, the rear view of the vehicle 1 is partially open such that components in the vehicle 1 can be seen.

The vehicle 1 includes a luggage room 10 and a tool storage device 340 arranged below a floor of the luggage room 10. The vehicle 1 includes the luggage room 10 in a rear portion thereof and a space within the luggage room 10 can be accessed through a vehicular rear opening 9 when a vehicular rear door 11 is open.

Figure 6:
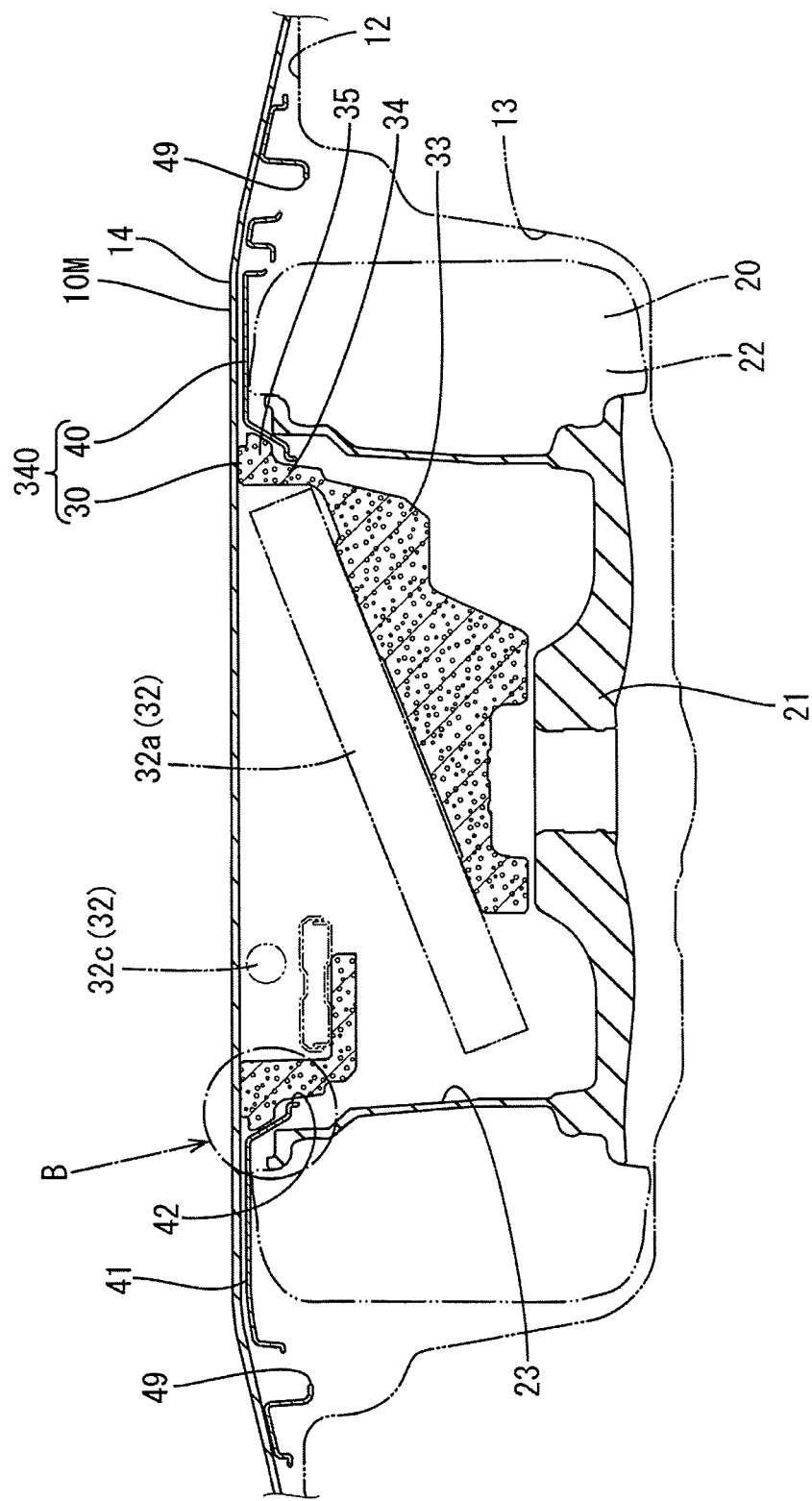
FIG. 6 is a cross-sectional view taken along A-A line illustrating the tool storage device in FIG. 1 on which a luggage mat is disposed.

A floor panel 12 is placed below the floor of the luggage room 10 (below a vehicle floor) and includes a storage recess 13 that is open upward. A spare tire 20 including a tire main body 22 and a wheel portion 21 is arranged within the storage recess 13 (a recess portion), as illustrated in FIG. 6. The wheel portion 21 has a wheel recess 23 inside the tire main body 22 and the wheel portion 21. The spare tire 20 is arranged in the storage recess 13 such that the wheel recess 23 opens upward.

The tool storage device 340 for storing tools therein is arranged in the wheel recess 23 that is in the storage recess 13 below the floor of the luggage room 10. The tool storage device 340 includes a storage member 30 (a first member) and a tray member 40 (a second member). The storage member 30 stores tools 32 (32a, 32b, 32c) therein. The tray member 40 is a plate-like member that is formed along a floor surface 10M and the storage member 30 is mounted in the storage recess 13 below the floor via the tray member 40.

A luggage mat 14 is placed on the spare tire 20 and the tool storage device 340 and provides the floor surface 10M of the luggage room 10, and luggage may be put on the floor surface 10M. The tray member 40 is a plate member that is disposed between the tire main body 22 and the luggage mat 14 and the tray member 40 and the tire main body 22 support the luggage mat 14 from a lower side. Thus, the luggage mat 14 forms the floor surface 10M.

Figure 2:
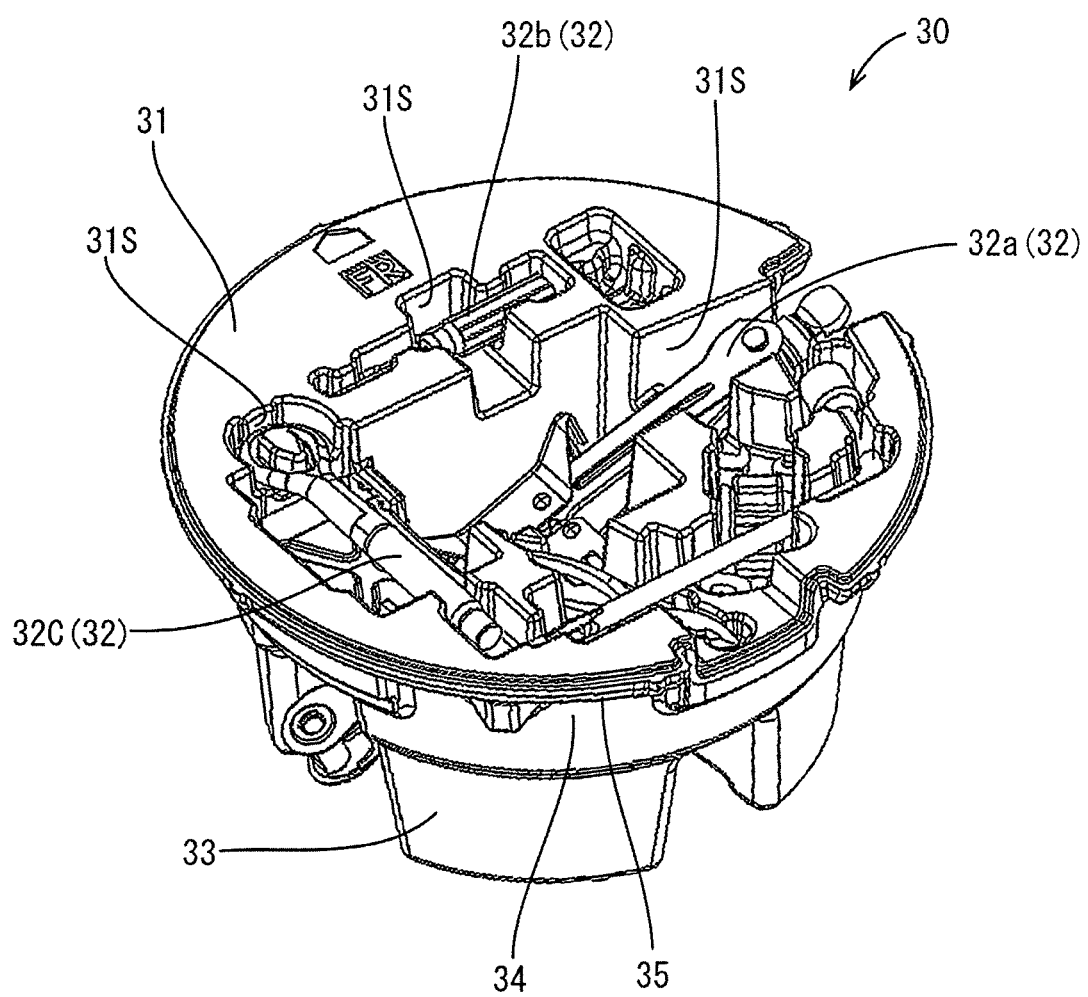
FIG. 2 is a perspective view illustrating a first member storing tools therein.

As illustrated in FIG. 2, the storage member 30 has a substantially columnar shape and has a height that can be put within the wheel recess 23. The storage member 30 includes a lower portion 33 and an upper portion 34. The upper portion 34 includes an upper surface 31 and a projected portion 35 (a projected portion) that projects outward from the upper portion 34 and has a flange shape. The storage member 30 further includes tool storage recesses 31S so as to be open in the upper surface 31 and each of the tools 32 (32a, 32b, 32c) is stored in a predetermined position. Thus, the tools 32 are stored in the storage member 30.

Figure 7:
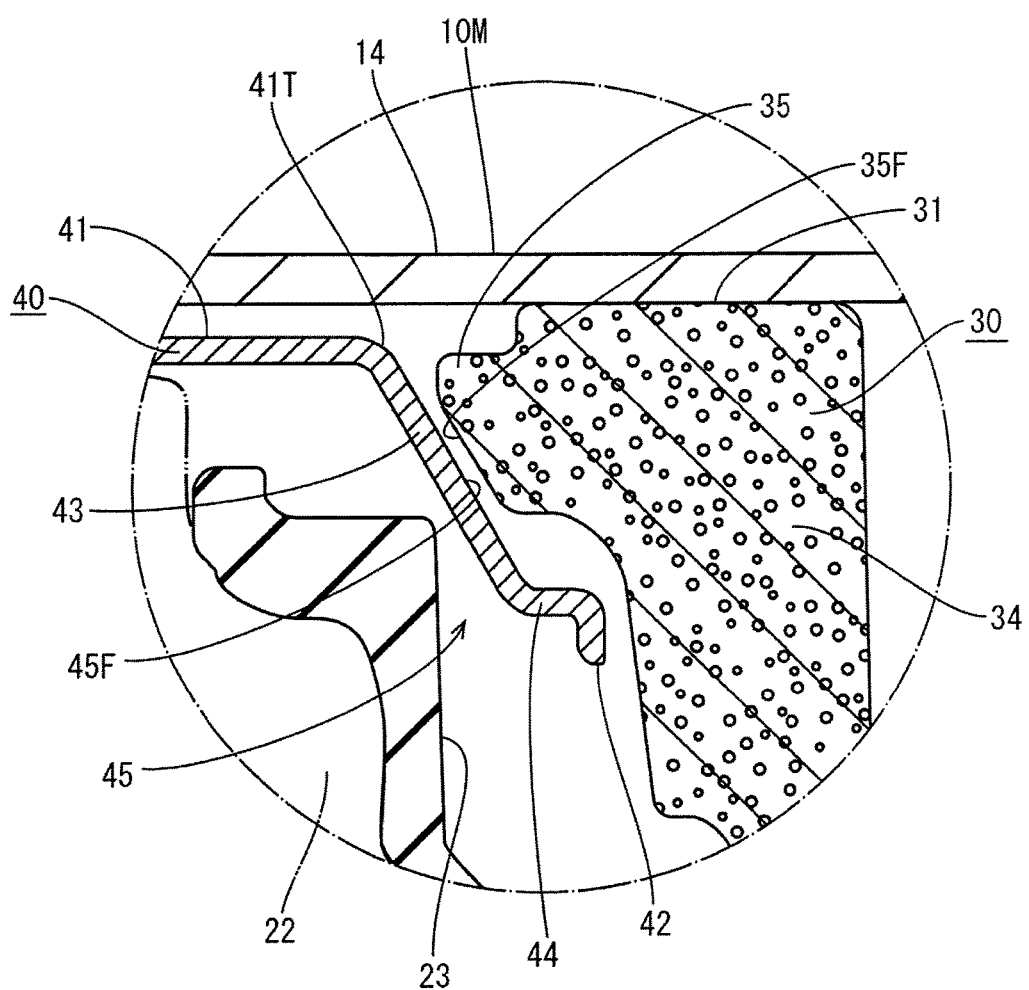
FIG. 7 is a cross-sectional view illustrating a portion B in FIG. 6.

As illustrated in FIGS. 6 and 7, the flange-shaped projected portion (the projected portion) 35 extends outward from a portion of the upper portion 34 near the upper surface 31. Therefore, the upper portion 34 near the upper surface 31 has an outer periphery greater than that of the lower portion 33 and the upper portion 34 below the projected portion 35. The projected portion 35 extends over a substantially entire outer periphery of the upper surface 31. As illustrated in FIG. 7, the projected portion 35 has an outer peripheral edge surface 35F that is inclined such that an outer diameter of the projected portion 35 is increased as is closer to the upper surface 31. The outer peripheral edge surface 35F follows an inclined surface 45F of a hole edge portion 45 of the tray member 40. The storage member 30 is made of foamed polypropylene that is foamed resin (specifically, polypropylene foam made with the bead method).

Figure 3:
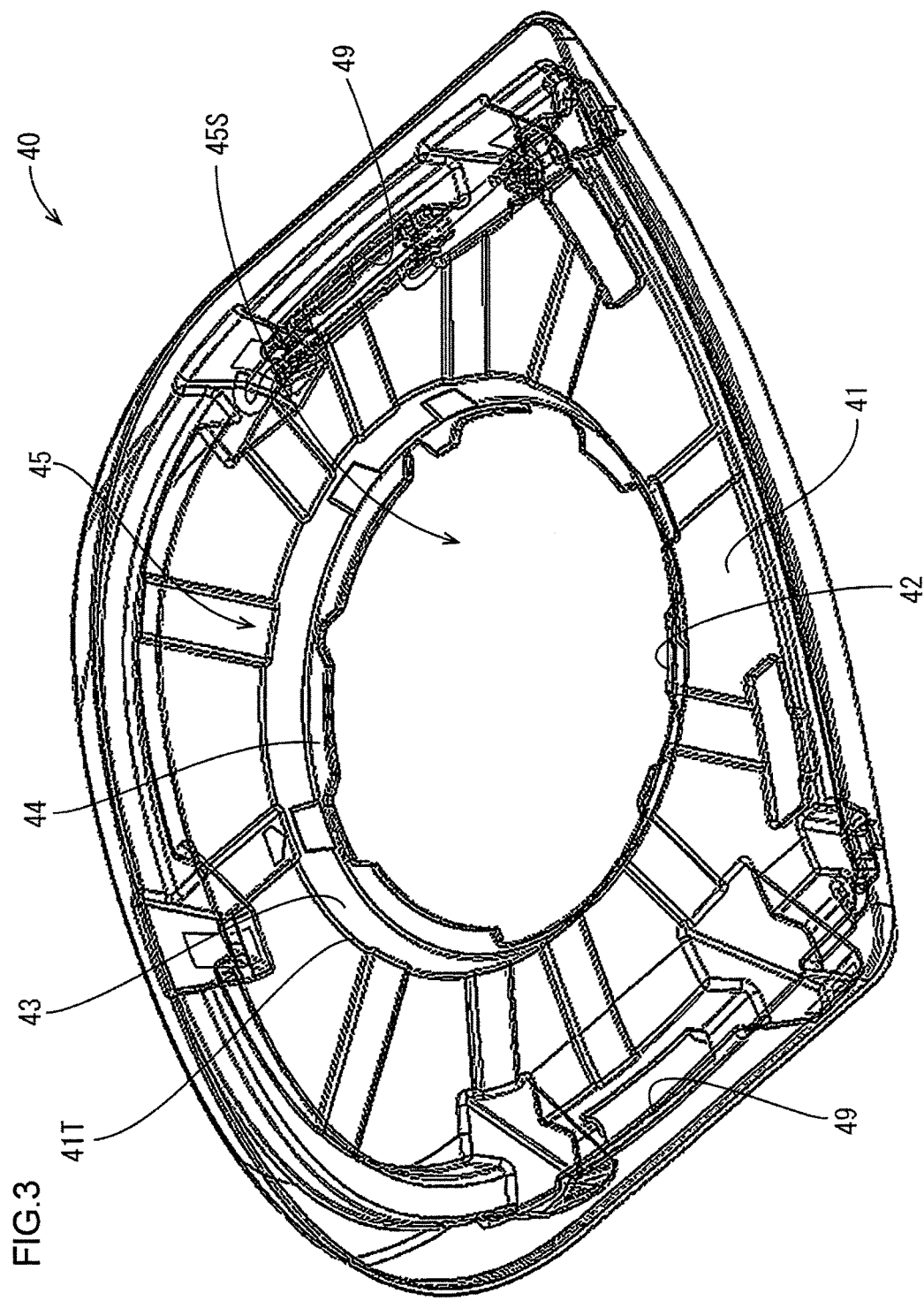
FIG. 3 is a perspective view illustrating a second member.

As illustrated in FIG. 3, the tray member 40 has a flat plate shape as a whole and includes a flat plate portion 41, an insertion hole 42, and the hole edge portion 45. The insertion hole 42 is formed in a middle portion of the flat plate portion 41 and is a substantially circular hole. The lower portion 33 of the storing member 30 is inserted through the insertion hole 42. The tray member 40 has a substantially frame shape. As illustrated in FIG. 3, the tray member 40 includes the hole edge portion 45 near a hole edge of the insertion hole 42. As illustrated in FIG. 7, the hole edge portion 45 includes an inner edge 41T of the flat plate portion 41, an inclined wall portion 43 having the inclined surface 45F, and a flange portion 44.

The hole edge portion 45 extends over an entire periphery of the insertion hole 42 has a substantially circular shape. The inclined surface 45F of the inclined wall portion 43 extends from the inner edge 41T of the flat plate portion 41 downward with being inclined toward a center of the insertion hole 42. The flange portion 44 extends inward (toward the center of the insertion hole 42) from a lower end of the inclined wall portion 43 to be parallel to the flat plate portion 41. The inclined surface 45F is inclined such that a diameter of the inclined wall portion 43 is decreased as is closer to the flange portion 44 from the inner edge 41T. The lower portion 33 of the storage member 30 (including a part of the upper portion 34 except for the projected portion 35) can be inserted through the insertion hole 42, that is, an inner space of the hole edge portion 45 (storage space 45S), as illustrated in FIG. 7. The tray member 40 is made of olefin polymer that is non-foamed resin (for example, TSOP-5 (trademark)).

Figure 4:
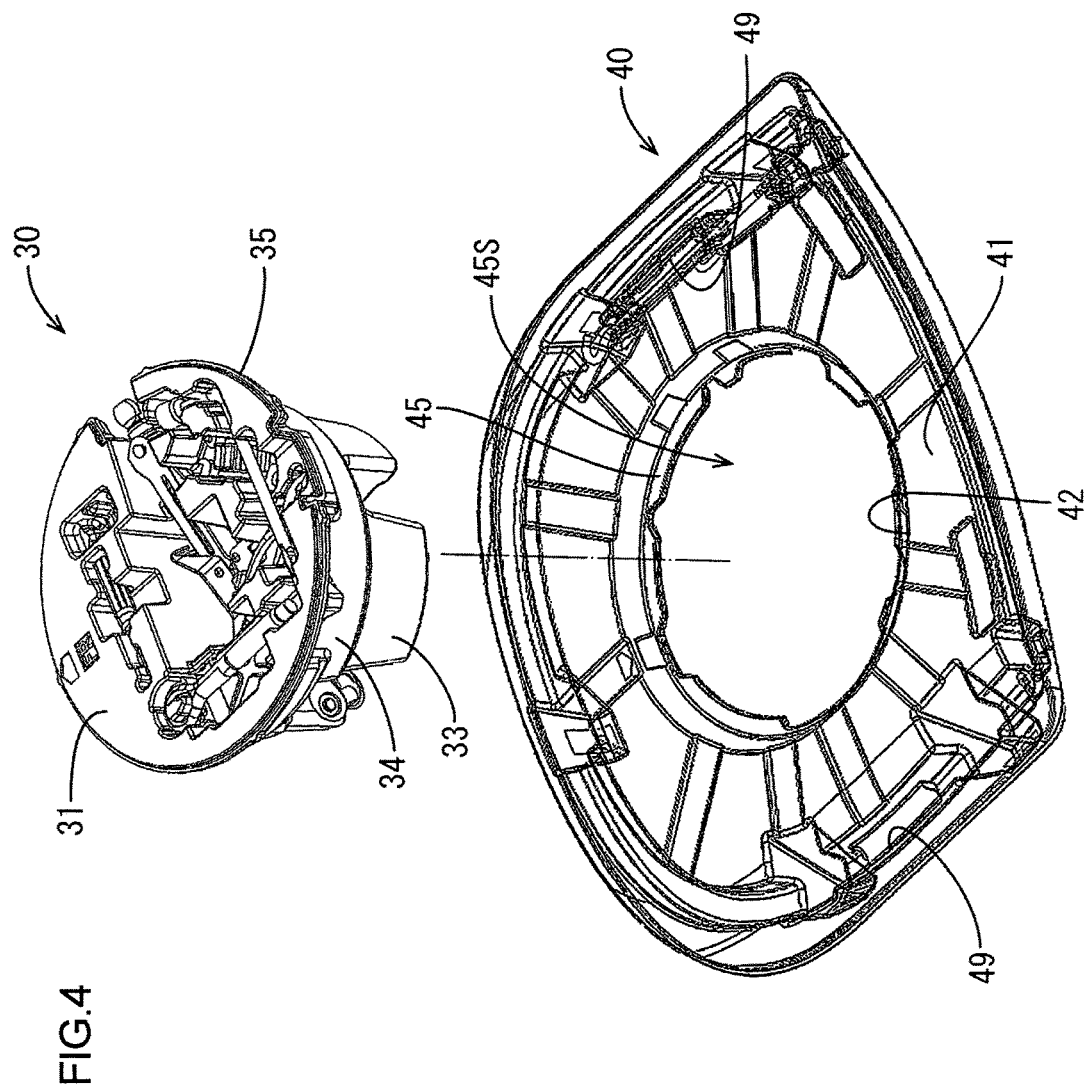
FIG. 4 is a perspective exploded view illustrating the first member and the second member.
Figure 5:
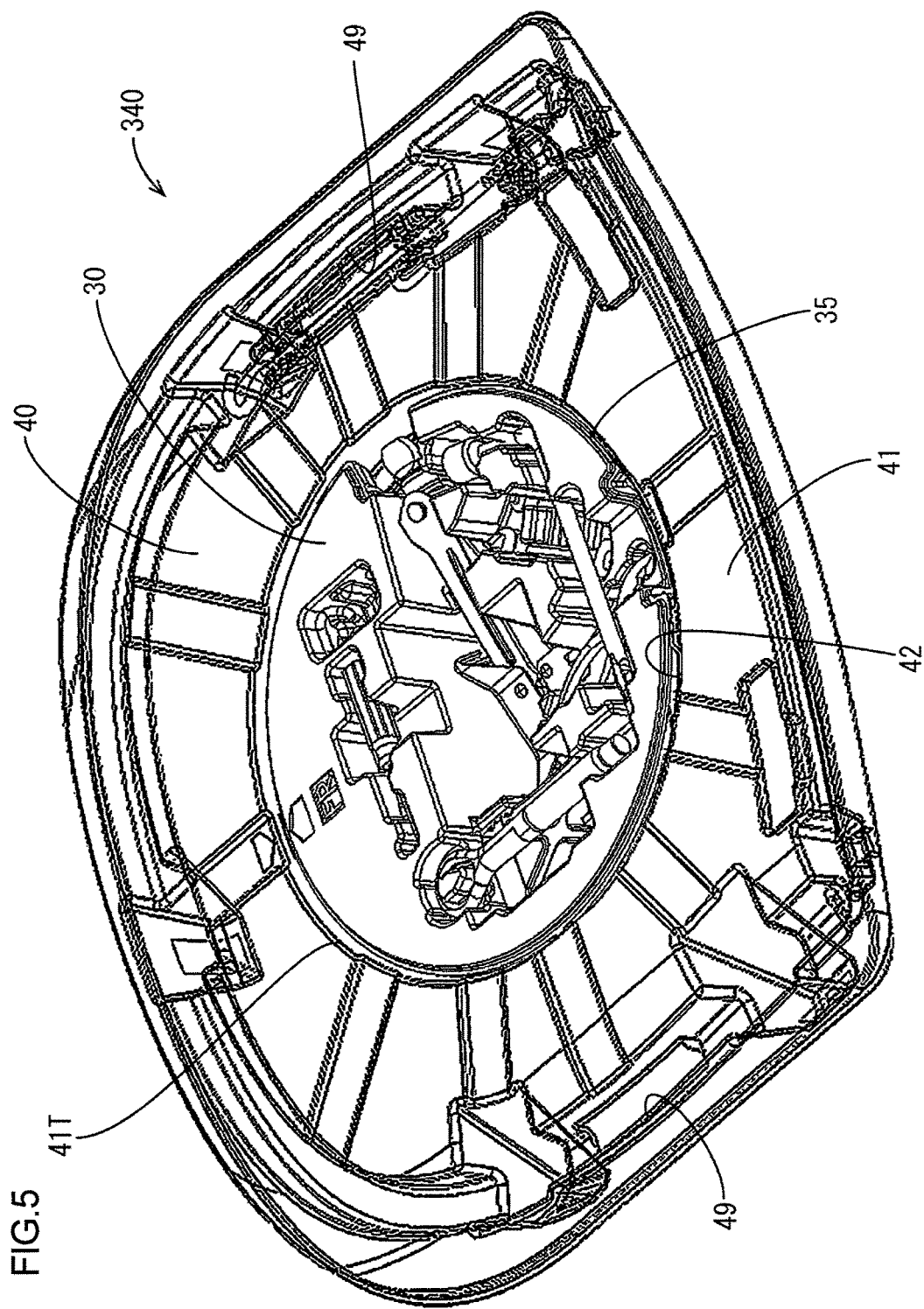
FIG. 5 is a perspective view illustrating the tool storage device including the first member and the second member that are fit together.

As illustrated in FIGS. 4 and 5, the lower portion 33 of the storage member 30 is inserted in and fit in the storage space 45S of the tray member 40 from the upper side to provide the tool storage device 340. The lower portion 33 and the part of the upper portion 34 of the storage member 30 except for the projected portion 35 can be inserted in the storage space 45S defined by the hole edge portion 45 of the tray member 40. Therefore, the projected portion 35 of the storage member 30 is overlapped with or may be stopped by the hole edge portion 45 of the tray member 40, as illustrated in FIGS. 6 and 7. Especially, the projected portion 35 may be put on the flange portion 44. The upper portion 34 including the projected portion 35 is not inserted in the storage space 45S. Thus, a part of the storage member 30 and a part of the tray member 40 are overlapped with each other such that the storage member 30 is mounted in the tray member 40. As illustrated in FIGS. 6 and 7, the upper surface 31 of the upper portion 34 of the storage member 30 is substantially on a same level as an upper surface of the flat plate portion 41 of the tray member 40.

As described before, the tool storage device 340 includes two components of the storage member 30 and the tray member 40 that are fit together as one component. The tool storage device 340 is stored in a space below the floor of the luggage room such that the storage member 30 is fit in the wheel recess 23 of the spare tire 20 and the tray member 40 (the flat plate portion 41) covers the tire main body 22. As illustrated in FIG. 6, the lower portion 33 has a bottom surface and the bottom surface is opposite a bottom surface of the wheel recess 23 of the spare tire 20 and an upper surface of the plate portion 41 of the tray member 40 is opposite the tire main body 22 of the spare tire 20 when the tool storage device 340 is arranged in the wheel recess 23.

The tray member 40 has cut-off portions 49 on two opposite sides with respect to the vehicular width direction. As illustrated in FIGS. 1, 3 to 5, an operator puts his/her hands in the cut-off portions 49 and lifts up the tray member 40 to remove the tool storage device 340. As described before, the projected portion 35 of the storage member 30 is overlapped with or stopped by the frame inner edge portion 45 of the tray member 40. Therefore, the tool storage device 340 as a whole is lifted up by lifting up the tray member 40, and the tool storage device 340 can be removed from the storage recess 13 (the wheel recess 23). Accordingly, the spare tire 20 that is arranged below the tool storage device 340 can be accessed easily and effectively.

The tool storage device 340 described above is made of two different materials and suitable material can be used for each of the members included in the tool storage device 340. Specifically, the first member (the storage member 30) that requires a certain capacity to store the tools 32 (32a, 32b, 43c) is made of light-weight material (first material) such that the tool storage device 340 is reduced in weight and the vehicle 1 is reduced in weight. The second member (the tray member 40) that receives the first member (30) to mount the first member in a space below the floor and has a plate shape along the floor surface 10M is made of a material having good rigidity (second material) to ensure constant strength such that the thickness of the second member in the vertical direction is reduced and a space above the floor (a luggage space in the luggage room) is increased. Accordingly, the suitable material is selected for a usage or a position of the components and the weight is reduced with ensuring a large space above the floor.

The tool storage device 340 includes two components (30, 40) that are fit to each other and is handled as one component. Therefore, the removal operation of the tool storage device 340 is easy and convenience is enhanced. The first member (30) is mounted on the second member (40) from the upper side such that the projected portion 35 of the storage member 30 is overlapped with or stopped by the frame inner edge portion 45 of the tray member 40. Thus, the two members (30, 40) are fit together with a simple method. According to such a configuration, the first member (30) is lifted up simultaneously when the second member (40) is lifted up. Therefore, the tool storage device 340 including the two components can be removed quite effectively. Further, a separate component for fitting the first member (30) and the second member (40) together is not required and a cost can be reduced.

The first member (30) that can store the tools 32 is made of foamed resin such that the tool storage device 340 is reduced in weight and the vehicle 1 is also reduced in weight. The second member (40) that receives the first member (30) to mount the first member in a space below the floor and has a plate shape along the floor surface 10M is made of non-foamed resin to ensure constant strength such that the thickness of the second member is reduced and a space above the floor (a luggage space in the luggage room) is increased.

The first member (30) is stored in the wheel recess 23 of the spare tire 20 arranged below the floor of the vehicle 1 and therefore, the space below the floor can be effectively used. The second member (40) is arranged to cover the tire main body 22 and therefore, the tire main body 22 is not seen from the outside and the luggage room has good appearance and the second member (40) can receive load from the luggage mat 14 that is placed on the floor.

<Other Embodiments>

The present technology is not limited to the description as described above with reference to the drawings. For example, the present technology may include following embodiments.

In the above embodiment, the storage member 30 is made of foamed polypropylene and the tray member 40 is made of olefin polymer (TSOP-5). However, it is not limited thereto. The storage member 30 may be made of other foamed resin such as foamed polyethylene, and foamed polystyrene, and the tray member 40 may be made of other non-foamed resin such as polycarbonate resin, and ABS resin.

What is claimed is:

1. A tool storage device configured for use with a vehicle floor of a vehicle comprising:
    a first member configured to store tools and made of a first material; and
    a second member receiving the first member to be arranged below the vehicle floor and having a plate shape configured to extend along a floor surface of the vehicle floor, the second member made of a second material different from the first material, wherein
    when a spare tire is disposed below the vehicle floor within an opening of a storage recess of the vehicle, the second member is configured to be opposite to a tire main body of the spare tire.

2. The tool storage device according to claim 1, wherein the first member and the second member are fit together.

3. The tool storage device according to claim 1, wherein the first member includes a lower portion that stores the tools therein and an upper portion having a projected portion having a flange shape and projecting outward from the upper portion,
    the second member has an insertion hole through which the lower portion of the first member is received, and
    the lower portion of the first member is mounted in the insertion hole of the second member from an upper side such that the projected portion overlaps a hole edge portion of the second member adjacent the insertion hole.

4. The tool storage device according to claim 1, wherein the first material is foamed resin and the second material is non-foamed resin.

5. The tool storage device according to claim 1, wherein the first member includes a lower portion that is configured to store the tools therein,
    the lower portion has a bottom surface that is configured to be opposite to a bottom surface of a wheel recess of the spare tire disposed below the vehicle floor.

6. The tool storage device according to claim 1, wherein the first member includes a lower portion that is configured to store the tools therein and an upper portion having a projected portion projecting outward from the upper portion,
    the second member includes a plate portion, an insertion hole extending through the plate portion, and a hole edge portion adjacent the insertion hole, and
    the lower portion of the first member is received through the insertion hole of the second member and the projected portion of the first member overlaps the hole edge portion of the second member.

7. The tool storage device according to claim 6, wherein the projected portion extends around a periphery of the upper portion of the first member and the hole edge portion of the second member extends around the insertion hole.

8. The tool storage device according to claim 6, wherein the upper portion of the first member has an upper surface,
    the plate portion of the second member has an upper surface, and
    the upper surface of the first member and the upper surface of the second member are substantially on a same level.

9. The tool storage device according to claim 1, wherein the second member is configured to extend outwardly beyond the opening of the storage recess.

10. The tool storage device according to claim 1, wherein when the tool storage device is used with the vehicle floor of the vehicle, the first and second member are configured to be liftable together to expose the spare tire disposed below the vehicle floor within the opening of the storage recess.

11. A tool storage device configured for use with a vehicle floor of a vehicle comprising:
    a first member configured to store tools and made of a first material; and
    a second member receiving the first member to be arranged below the vehicle floor and having a plate shape configured to extend along a floor surface of the vehicle floor, the second member made of a second material different from the first material, wherein
    the first member includes a lower portion that is configured to store the tools therein and an upper portion having a projected portion projecting outward from the upper portion,
    the second member includes a plate portion, an insertion hole extending through the plate portion, and a hole edge portion adjacent the insertion hole,
    the lower portion of the first member is received through the insertion hole of the second member and the projected portion of the first member overlaps the hole edge portion of the second member,
    the hole edge portion includes an inclined wall portion and a flange portion,
    the inclined wall portion extends from an insertion hole-side edge of the plate portion and is inclined downward toward a center of the insertion hole,
    the flange portion extends toward the center of the second member to define the insertion hole from a lower end of the inclined wall portion so as to be parallel to the plate portion, and
    when a spare tire is disposed below the vehicle floor within an opening of a storage recess of the vehicle, the second member is configured to be opposite to a tire main body of the spare tire.

12. The tool storage device according to claim 11, wherein the projected portion has an outer peripheral edge surface that is opposite the inclined wall portion and inclined along the inclined wall portion.

* * * * *